United States Patent [19]

Katz et al.

[11] Patent Number: 5,176,099
[45] Date of Patent: Jan. 5, 1993

[54] ANTENNA BALL FOR VEHICLE IDENTIFICATION

[75] Inventors: Paul C. Katz, Chicago; Patrick A. Pisciotto, Wood Dale; Gary I. Robin, Niles, all of Ill.

[73] Assignee: Triplex Manufacturing Company, Niles, Ill.

[21] Appl. No.: 784,769

[22] Filed: Oct. 30, 1991

[51] Int. Cl.⁵ .................. B60Q 9/00; B60Q 9/06
[52] U.S. Cl. .................. 116/209; 116/28 R; 248/309.1
[58] Field of Search .......... 116/209, 28 R, 173; 248/309.1, 311.2

[56] References Cited

U.S. PATENT DOCUMENTS

| | | | |
|---|---|---|---|
| 2,420,772 | 5/1947 | Dalton | 116/28 R |
| 3,433,203 | 3/1969 | Sharkey et al. | 116/28 R |
| 3,712,263 | 1/1973 | Faragosa | 116/28 R |
| 3,785,337 | 1/1974 | Flowerday | 116/209 |
| 4,224,707 | 9/1980 | Mariani | 116/173 X |
| 4,905,624 | 3/1990 | Krolzick | 116/222 X |
| 4,972,795 | 11/1990 | Mace | 116/209 X |

*Primary Examiner*—Daniel M. Yasich
*Attorney, Agent, or Firm*—Fitch, Even, Tabin & Flannery

[57] ABSTRACT

Disclosed is a vehicle identifier in the form of an antenna ball attachable and detachable from the antenna of a vehicle and including an identification mark thereon for identification of a specific vehicle from amongst a plurality of vehicles. The vehicle identifier includes two separate sections secured together about an antenna by engagement of protrusions extending from one section with apertures provided in the other section, allowing for simple attachment and detachment of the vehicle identifier to a vehicle.

17 Claims, 1 Drawing Sheet

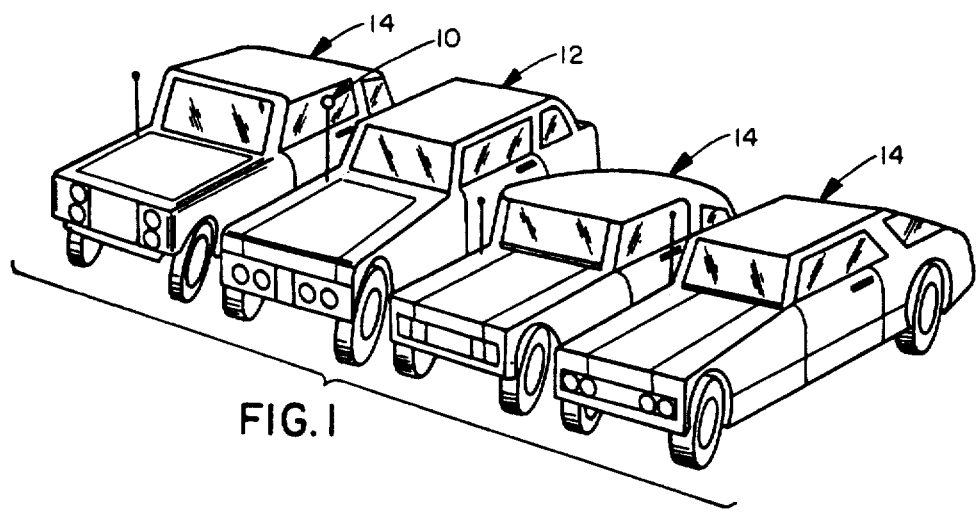
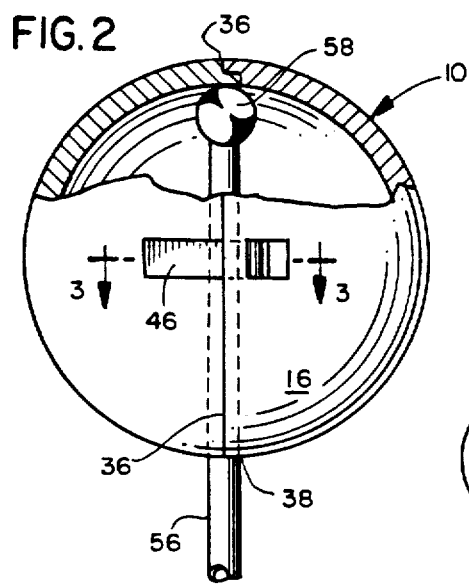
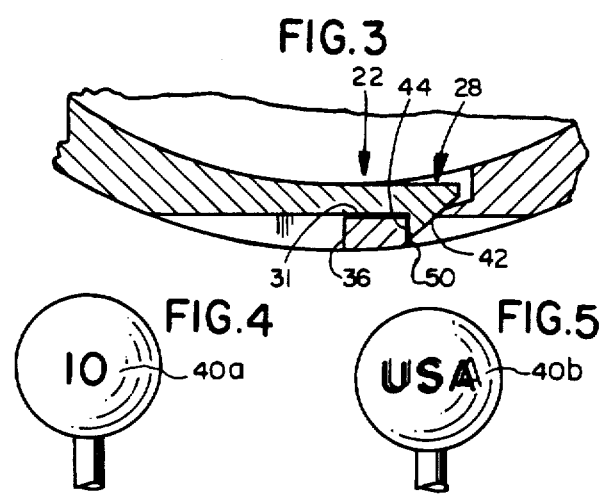
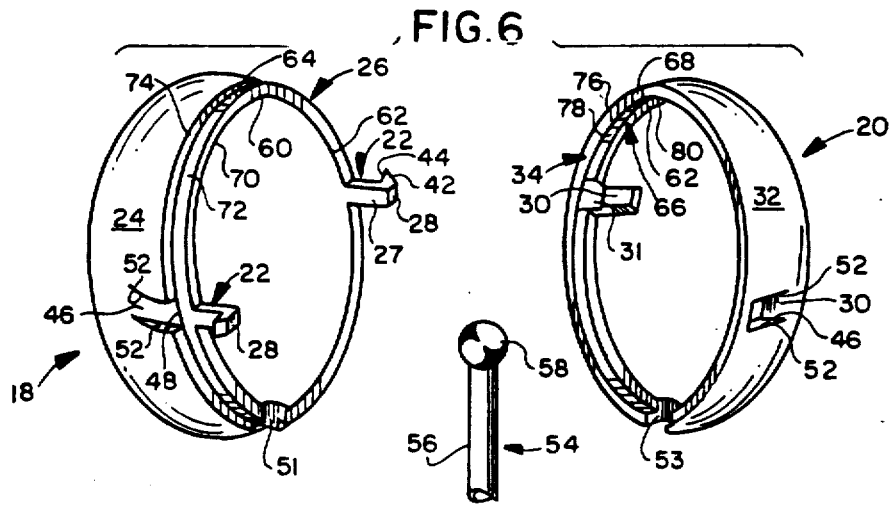

ANTENNA BALL FOR VEHICLE IDENTIFICATION

FIELD OF THE INVENTION

The present invention is directed to a vehicle accessory, and more particularly, to a vehicle accessory used for identifying a selective vehicle.

BACKGROUND OF THE INVENTION

It is common practice for motorists to park their vehicles in large parking facilities. Motorists do this many times at shopping malls, entertainment event parking facilities, airports and on city streets. It is important that motorists remember the location of their vehicles. However, many times motorists are concerned and preoccupied with remembering information relating to the tasks at hand and for which they traveled; hence, they do not pay attention or remember the location of their vehicles. This is especially true if the motorist is not completely familiar with the description of the vehicle which they are driving, for example, when driving a friend's vehicle or a rented vehicle.

There are many situations where motorists quickly park their vehicles, and when returning, they do not remember the vehicle's location. A classic example occurs when returning from a business trip or vacation, wherein the motorist attempts, after a few days, a week, a month or even longer, to locate their vehicle in a large parking facility. Many times, the motorist's memory does not recall the exact or even approximate location of their vehicle. Also, this memory lapse often occurs before or during attendance at an entertainment event. A further example occurs when motorists park their vehicles in a long row of vehicles along a street and upon returning from a store cannot remember where or in which direction their vehicle is located. Overall, there are many incidents happening daily in which motorists cannot remember the exact location of their vehicles even though their vehicles are within eyesight. Thus, there is a need for a vehicle identifying device to assist in locating vehicles.

In addition to the need for a vehicle identifying device, there is a need for such an identification device which can distinguish one vehicle from another. The difficulty of differentiating one vehicle from another can be accentuated when the motorist is not familiar with the vehicle or when there is more than one vehicle identification device being used on different vehicles. For example, when locating a friend's vehicle or a rental vehicle in a parking facility, there could be multiple vehicles with similar identification devices. If the vehicle identification device has a unique identifying feature, the vehicle could be easily distinguished from the other vehicles having differing identifying features. Therefore, the vehicle identification device requires a distinctive feature to distinguish it from similar looking devices.

In order for a vehicle identifying device to be practical, it should be inexpensive to manufacture and easy and safe for motorists to use and should have minimal vehicle damage potential. More specifically, the identification device should be durable, lightweight and portable. While the identification device should be large enough to be visible from a reasonable distance, it must be compact so as to fit conveniently in a storage compartment, such as a glove box. Further, the identification device should be easy to attach and to remove from the vehicle without damaging the vehicle. Moreover, the identification device should not cause damage to the vehicle while the vehicle is in operation. Consequently, since a motorist may leave the identification device attached to the vehicle, the identification device should be designed in such a manner that it will not cause any harm to the vehicle during operation. Thus, these many design, safety and use features are requisite in an acceptable vehicle identifying device.

SUMMARY OF THE INVENTION

The present invention is directed to an easily removable vehicle identifier device used to identify and locate vehicles. The vehicle identifier of the present invention aids motorists who cannot accurately remember the precise location of their vehicle or who are not familiar with the appearance of the vehicle for which they search. The vehicle identifier of the present invention further provides a durable, compact and lightweight device which can be efficiently and inexpensively manufactured.

In the present invention, the vehicle identifier is a substantially continuous sphere separated by a parting line which partitions the sphere into its major elements, a first hemisphere and a second hemisphere. The first hemisphere has a first exterior surface for displaying an identification mark and a plurality of protrusions formed integral with the first hemisphere for engagement with the second hemisphere. The preferred embodiment provides a pair of diametrically opposed protrusions wherein the end of each protrusion includes a hook for forming a locking engagement with the second hemisphere. The first hemisphere additionally has a first mating lip having a planar and substantially continuous circular configuration tracing an outer edge of the first hemisphere. The first mating lip is interrupted by a first semi-circular depression for forming an attachment aperture.

The second hemisphere has a second exterior surface for displaying an identification mark and a plurality of apertures for receiving the plurality of protrusions from the first hemisphere to form the locking engagement. The preferred embodiment has a pair of diametrically opposed apertures for receiving the protrusions of the first hemisphere. Similar to the first hemisphere, the second hemisphere has a second mating lip having a planar and substantially continuous circular configuration tracing an outer edge of the second hemisphere; additionally, the second lip complements the first mating lip during mating of the first mating lip and the second mating lip to ensure against shifting of the two mating lips. The second mating lip also is interrupted by a second semi-circular depression for forming the attachment aperture.

A mating line or interface surface 36 is formed along the interface of the first hemisphere and the second hemisphere, whereat an attachment aperture is formed for receiving a vehicle component therein for attachment to the vehicle. Upon assembly of the vehicle identifier, a generally continuous spherical exterior surface is formed on which a symbol, such as a number, personal mark or advertisement, can be displayed.

In the present invention, the vehicle identifier is effortlessly attached to a vehicle's fixed antenna by arranging the first hemisphere and the second hemisphere so that the attachment aperture formation is at the lowest position of the first hemisphere and the second hemisphere, and an antenna end, in which an internal top portion of the vehicle identifier rest upon after being assembled, is located intermediate the attachment aperture formation and the top portion of the vehicle identifier. Then, the first hemisphere and the second hemisphere are pressed together thereby mating the first mating lip and the second mating lip and securing the locking engagement between the protrusions and the receiving aperture. The locking engagement, that does not naturally release, is secured when a mating surface of the hook mates with a mating surface of the aperture. At this time, the attachment aperture formation surrounds a fixed staff portion of the antenna in a manner not damaging the antenna, but the attachment aperture should surround the antenna staff in a sufficient manner whereby to prevent a substantial gap between the attachment aperture and the antenna staff so as to prevent damage and rattling noise.

Further, the vehicle identifier is compact enough to fit easily in a vehicle storage compartment, such as a glove box or a trunk. The vehicle identifier additionally does not cause damage to the vehicle because it has a removable attaching feature, and its spherical configuration minimizes wear associated with wind resistance. The vehicle identifier provides an exterior surface which can adequately be seen from a reasonable distance and can display an identification mark particular to that selective vehicle for differentiating between other vehicles and vehicle identifiers. Overall, the present invention provides a vehicle identifier which is simple and inexpensive to manufacture while being durable, lightweight, compact and visible.

BRIEF DESCRIPTION OF THE DRAWINGS

The present invention will be described in connection with the accompanying drawings, which illustrate the preferred embodiments and details of the invention, and in which:

FIG. 1 is a perspective view depicting the vehicle identifier embodying various features of the present invention shown affixed to an antenna of a vehicle which is parked in a row of other vehicles;

FIG. 2 is an elevational, partially cut-away view of the vehicle identifier of FIG. 1 having a partial cross-sectional view;

FIG. 3 is a enlarged fragmentary sectional view of the vehicle identifier embodying principles of the present invention taken along the line 3—3 of FIG. 2;

FIG. 4 is a perspective view of a vehicle identifier depicting an identification mark in accordance with the present invention;

FIG. 5 is a perspective view of a vehicle identifier depicting a second identification mark in accordance with the present invention; and FIG. 6 is an exploded perspective view of the vehicle identifier and the antenna with the vehicle identifier separated into two parts to display its elements.

DETAILED DESCRIPTION OF THE INVENTION

A vehicle identifier 10 embodying various features of the present invention is affixed to a vehicle 12 to enable easy location and identification of the vehicle, for example, while the vehicle is parked among other vehicles 14 as illustrated in FIG. 1. The vehicle identifier's particular association with the vehicle aids motorists in locating and identifying their vehicle from a distance. It is preferred to attach the vehicle identifier 10 to a vehicle antenna 54 whereby the vehicle identifier 10 is situated above the vehicle 10 to improve its visibility. The vehicle identifier 10 can have identification marks 40a and 40b such as a symbol, number or advertisement. This identification marks 40a and 40b then permits motorists to determine whether or not the vehicle is theirs. In order for the vehicle identifier to be practical, it should be simple to attach and detach, as well as simple and inexpensive to manufacture. The vehicle identifier of the present invention can be effortlessly attached and removed from the vehicle to be stored or transferred and is durable, lightweight and compact.

As shown in FIGS. 2-6, the vehicle identifier 10 of the present invention comprises a first hemisphere 18 and a second hemisphere 20 which are brought together about an antenna 54 or other vehicle component to form a near continuous spherical exterior surface 16 for displaying a visible indicia, such as an identification mark 40a, 40b, and for securing to the antenna 54. In order to provide locking engagement between the first hemisphere 18 and the second hemisphere 20, the first hemisphere 18 has a pair of integrally formed protrusions 22 and a first mating lip 26 which engage with complementary apertures 30 and second mating lip 34, respectively, of the second hemisphere 20. As best seen in FIG. 6, each of the protrusions 22 have a hook 28 formed at the end thereof facing in the radially outward direction for mating with the pair of apertures 30 in the second hemisphere 20 to form a locking engagement, as best shown in FIG. 3, and described further, below. Mating of the complementary first mating lip 26 and second mating lip 34 provides additional engagement between the first hemisphere 18 and the second hemisphere 20. The complementary relationship between the first mating lip 26 and the second mating lip 26 also prevents shifting of the first hemisphere 18 and the second hemisphere after being secured together. Accordingly, when the first and second hemispheres are integrated as one, the first exterior surface 24 of the first hemisphere 18 and the second exterior surface 32 of the second hemisphere 20 form a near continuous exterior surface 16. During attachment to a vehicle, the first and second hemispheres are brought together about an antenna 54 which is accommodated within an attachment aperture 38 as described in greater detail below.

The pair of diametrically opposed integral protrusions 22 extend generally perpendicularly from the first mating lip 26, and comprise an intermediate flexible body portion. The preferred flexible body portion is an intermediate rectangular block 27 which extends to a hook 28 located at the free end of rectangular block 27. The rectangular block 27 allows the hook 28 to extend a predetermined distance to the receiving aperture 30 of the second hemisphere. The hook 28 faces radially outward from the center of the circular first mating lip 26 and biases outward against the second hemisphere 20, thereby keeping the hook 28 static in the receiving aperture 30.

The hook 28 has a tapered portion 42 and a surface engagement portion 44. The tapered portion 42 acts as a camming surface during engagement to assist in inserting the protrusion 28 into the aperture 30 of the second hemisphere. That is, during insertion of the protrusions 22 into the apertures 30, the tapered portions are pressed against recessed interior rim surfaces 31 whereby camming action therebetween effects radially inward flexing of the protrusions 22 to clear the interior rim surfaces 31 for ultimate shaping engagement of the hook 28 portion of the protrusions within the apertures 30. Upon receipt of the hooks 28 within the apertures 30, the outwardly biased hooks 28 are engagingly received within the apertures 30 whereby the surface engagement portion 44 mates with a mating surface 50 of the aperture 30 to prevent the first and second hemispheres from separating thereby forming a locking engagement, as best shown in FIG. 3. As a result of the hook 28 biasing outward upon the surface engagement portion 44, the engagement between the surface engagement portion 44 and the mating surface 50 is maintained so that the first and second hemispheres will not separate absent manual squeezing as explained below.

Separation of the first and second hemispheres is attained by squeezing or pinching inwardly upon the first hemisphere, where the preferred hemisphere is resilient, at the diametrically opposed ends thereof corresponding to the location of the protrusions 22. This deflects the protrusions 22 inward allowing clearance of the engagement portion 44 past the mating surface 50. A pair of indentations or recess grooves 46 are provided, which are co-extensive with the integral protrusions 22, having a rectangular configuration defined by a bottom 48 and a pair of sidewalls 52 for assisting in attachment and detachment of the vehicle identifier 10 to the vehicle. The location of these recess grooves 46, at the integral protrusions 22, is important because the person detaching the vehicle identifier 10 will naturally position their fingers on the recess groves 46 in order to obtain a sufficient grip to disengage the protrusions 22 from the aperture 30. After the locking engagement has been disengaged, the first hemisphere and the second hemisphere can be easily separated by pulling them apart. In accordance with the preferred vehicle identifier, the use of tools to disengage the locking engagement is not necessary. As will be described later, the vehicle identifier can easily be disassembled for storage or transfer.

As shown in FIGS. 2 and 6, the first hemisphere 18 and the second hemisphere 20 are easily attached to a fixed staff antenna 54 of a vehicle. The antenna generally has a staff portion 56 and an enlarged end tip 58. To attach and assemble, the vehicle identifier 10 is affixed so as to surround the staff portion 56 while the vehicle locator 10 rests on the end tip 58.

More specifically in order to attach the vehicle identifier 10, the first hemisphere 18 and the second hemisphere 20 are orientated in a manner so the first antenna receiving aperture 51 of the first hemisphere 18 and the second antenna receiving aperture 53 of the second hemisphere 20 to form an attachment aperture 38 to receive the antenna staff 56 therein while the end tip 58 remains intermediate of top portions 60 and 62 of the first hemisphere 18 and second hemisphere 20, respectively, and the first antenna receiving aperture 51 and the second antenna receiving aperture 53 of the first and second mating lips 26 and 34, respectively. After the orientation is completed, the first hemisphere 18 and the second hemisphere 20 are moved together whereby, in addition to engagement of the projections 22 with the apertures 30, the first mating lip 26 complementarily mates with the second mating lip 34 in order to prevent shifting between the first and second mating lips.

The first exterior surface 24 of the first hemisphere 18 is recessed or stepped down inward adjacent the first mating lips 26 to form a first interface surface comprising a step defined by first interface surfaces 70, 72 and 74 (see FIG. 5). The interior surface 25 of the second hemisphere 20 is recessed radially outward of the interior surface 25 adjacent the second mating lip 34 to form the complementary second interface surface comprising a step or recess 66 defined by second interface surfaces 76, 78 and 80. The steps of the first and second mating lips are complementary, whereby the first mating lip 26 is received in the recess 66 at the second mating lip 34 and secured therein with the portion 78 of the second mating surface acting as a collar about the portion 72 of the first interface surface. The first antenna receiving aperture 51 and the second antenna receiving aperture 53 form the attachment aperture 38 when brought together, which aperture 38 is formed at the parting line and surrounds the antenna staff 56. The diameter of the attachment aperture 38 preferably is approximately the same as the diameter of the antenna staff 56; however, the diameter of the aperture 38 should be large enough so as not to damage the antenna staff 56, but not larger than the diameter of the end tip 58 to assure that the vehicle identifier 10 does not slide off the antenna 54. After assembly is completed, the vehicle identifier is lowered, so it rests on the antenna end 58, as best seen in FIG. 2.

As shown in FIGS. 4 & 5, the identifying symbols 40a and 40b on the exterior surface of the vehicle identifier 10 can be of any type, such as an identification number 40a, personal identification number, or even an advertisement 40b. The number 40a may be used similar to that of a symbol. For example, a car rental agency can assist renters to their respective cars by simply giving the number corresponding to the rented car. The cars may then have a vehicle identifier 10 bearing a representative numeral. This method is simpler than using license plate numbers, and when the motorist finds the car, the vehicle identifier can be easily removed from the antenna and placed in a secure location within the vehicle, such as in a glove box.

As has been mentioned, the vehicle identifier 10 is easily removable from the antenna 54. To remove, one simply applies pressure to the diametrically opposed recess grooves 46 of the first hemisphere 18 and, at the same time, pulls apart the first hemisphere 18, gripping recess grooves 46, of the first hemisphere 18 and, at the same time, pulls apart the first hemisphere 18, gripping recess grooves 46, of the first hemisphere 18 and gripping recess grooves 46 of the second hemisphere 20. As previously indicated, this removable feature enables motorists to easily take the vehicle identifier off the antenna for storage purposes or transfer to another vehicle. Further, the size of the vehicle identifier is predetermined so as to easily fit in a vehicle's glove box. Similarly, if the motorist does not remember to remove the identifier before locking his vehicle, the vehicle identifier can be removed and simply placed in the motorist's pocket or bag. As mentioned before, the vehicle identifier is easily removed without the use of any tools, such as a screwdriver, or other devices.

Another important feature of this invention is that the vehicle identifier 10 does not damage the antenna and, likewise, any other fixture to which the vehicle identifier is attached even when the vehicle identifier is left attached to the vehicle during operation. The preferred spherical configuration provides reduced frictional resistance when leaving the vehicle identifier on the antenna during movement. This reduction in friction, due to the spherical configuration, reduces the potential for damage to the antenna. Further, the vehicle identifier 10 of the present invention is constructed of a light, durable plastic, but can easily be created from any other capable material, such as metal, wood or styrofoam. The lightweight characteristic prevents exerting large amounts of pressure on the antenna, thereby preventing undesired bending of the antenna. Similarly, the vehicle identifier can have different shapes, thereby not being limited to a spherical shape. For example, the vehicle identifier could have a rectangular box shape, triangular box shape, or may be cylindrical.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A vehicle identifier for identifying a selective vehicle, comprising:
   a first half having a first exterior surface and a plurality of protrusions formed integral therewith;
   a second half having a second exterior surface;
   the second half being formed with a plurality of apertures for engagingly receiving the plurality of protrusions from the first half, a substantially continuous exterior surface being formed by the first and second exterior surfaces upon assembly together of the first half and the second half with the protrusions engaged with the apertures, a mating line being defined on the line along which the first and second exterior surfaces meet to form the continuous exterior surface;
   the first half being resilient and application of an inward force to said first half effecting flexing thereof and said protrusions integral therewith to disengage said protrusions from said apertures; and
   the first half and second half being formed to define an attachment aperture disposed on the mating line for receiving a vehicle component therein for attachment of the vehicle identifier to a vehicle.

2. A vehicle identifier in accordance with claim 1 wherein the first half and the second half are resilient bodies.

3. A vehicle identifier in accordance with claim 1 wherein the first half and the second half are detachably secured by a locking engagement in which each of said protrusions is biased radially outward and comprises a flexible body portion having a free end biased radially outward and formed with a camming surface for flexing the body portion upon sliding engagement of the protrusions in the apertures, the apertures being formed with an engagement surface to engage and latch the free end securely within the aperture.

4. A vehicle identifier in accordance with claim 1 wherein the first half includes indentations therein in proximity with the protrusions, application of inward force at the indentations effecting disengagement of the protrusions from the aperture and effecting disassembly of the first half and the second half.

5. A vehicle identifier in accordance with claim 1 wherein the substantially continuous exterior surface includes visible indicia thereon for identification of a selective vehicle.

6. A vehicle identifier in accordance with claim 1 wherein the first half and the second half are hemispheres.

7. A vehicle identifier in accordance with claim 1 wherein the protrusions may be disengaged form the apertures without using a tool.

8. A vehicle identifier in accordance with claim 1 wherein first half and second half have predetermined diameter dimensions upon which the vehicle identifier can be stored in a vehicle's storage compartment.

9. A vehicle identifier removably mountable on an automobile antenna for quickly identifying and locating a selective auto, comprising:
   a first hemisphere having a first exterior surface and a first mating surface;
   a second hemisphere having a second exterior surface and a second mating surface complementary to said first mating surface;
   a pair of diametrically opposed protrusions formed integral with the first hemisphere, and extending generally perpendicularly from the plane defined by the first mating surface;
   the second hemisphere including a pair of diametrically opposed apertures for receiving the pair of protrusions from the first hemisphere, a generally continuous spherical exterior surface being formed upon engagement of the first hemisphere and the second hemisphere, and a mating line being defined along the mating of the first hemisphere and the second hemisphere;
   a first antenna receiving aperture portion formed adjacent the mating surface of the first hemisphere;
   a second antenna receiving aperture portion formed adjacent to the mating surface of the second hemisphere, an auto antenna being secured in an aperture defined by the first antenna receiving aperture portion and the second antenna receiving aperture portion upon bringing together the first hemisphere and the second hemisphere.

10. A vehicle identifier in accordance with claim 9 wherein the first hemisphere and the second hemisphere are resilient bodies and where the engagement of the first hemisphere and the second hemisphere is disengageable upon inward flexing of the first hemisphere in proximity to the protrusions.

11. A vehicle identifier in accordance with claim 9 wherein the first hemisphere includes indentations therein in proximity with the protrusions, application of inward force at the indentations effecting disengagement of the protrusions from the apertures.

12. A vehicle identifier in accordance with claim 9 wherein the protrusions are biased radially outward and include a radially outwardly extending portion securely engageable within the apertures.

13. A vehicle identifier in accordance with claim 9 wherein the protrusions include a camming surface for slidable receipt of said protrusions in the apertures.

14. A vehicle identifier in accordance with claim 9 wherein the substantially continuous exterior surface includes visible indicia thereon for identification of a selective vehicle.

15. A vehicle identifier in accordance with claim 9 wherein the first mating surface and the second mating surface include complementary steps thereat to prevent shifting of the mating line.

16. A vehicle identifier in accordance with claim 9 wherein the first hemisphere and second the second hemisphere have predetermined diameter dimensions upon which the vehicle identifier can be stored in a vehicle's storage compartment.

17. A vehicle identifier having a locking engagement which can be quickly and easily engaged and disengaged comprising:
- a first resilient body;
- a second resilient body;
- a pair of diametrically opposed protrusions formed integral with the first resilient body;
- a pair of diametrically opposed apertures formed in the second resilient body for engagingly receiving the protrusions;
- the protrusions being biased radially outward and each including a flexible body portion having a proximal first end attached to the first resilient body, and a distal second end which is a free end biased radially outward and formed with a camming surface for flexing the first resilient body portion radially inward upon slidable engagement of the protrusions in the apertures;
- the apertures in the second resilient body each including an engagement surface to engage and latch the free end of each protrusion securely within the respective aperture; and
- the first resilient body having indentations therein in proximity with each protrusion, application of an inward force at the indentations effecting radially inward displacement of the protrusions to effect disengagement of the protrusions from the apertures.

* * * * *

UNITED STATES PATENT AND TRADEMARK OFFICE
CERTIFICATE OF CORRECTION

PATENT NO. : 5,176,099

DATED : January 5, 1993

INVENTOR(S) : Paul C. Katz et al.

It is certified that error appears in the above-indentified patent and that said Letters Patent is hereby corrected as shown below:

<u>Title Page</u>

[57] Abstract, line 6, change "separate" to --separable--.

Column 4, line 4, change "This" to --These--.

Column 4, line 5, change "permits" to --permit--.

Column 4, line 35, change "26" to --34--.

Column 5, line 29, change "groves" to --grooves--.

Column 6, lines 43-45, delete "and, at the same time, pulls apart the first hemisphere 18, gripping recess grooves 46, of the first hemisphere 18".

UNITED STATES PATENT AND TRADEMARK OFFICE
CERTIFICATE OF CORRECTION

PATENT NO. : 5,176,099
DATED : January 5, 1993
INVENTOR(S) : Paul C. Katz et al.

It is certified that error appears in the above-indentified patent and that said Letters Patent is hereby corrected as shown below:

<u>In The Claims</u>

Column 8, line 2, change "form" to --from--.

Column 8, line 65, after "and" delete "second".

Signed and Sealed this

Sixteenth Day of May, 1995

Attest:

BRUCE LEHMAN

Attesting Officer    Commissioner of Patents and Trademarks